United States Patent
Abbott et al.

(10) Patent No.: US 6,671,808 B1
(45) Date of Patent: Dec. 30, 2003

(54) USB-COMPLIANT PERSONAL KEY

(75) Inventors: Shawn D. Abbott, Calgary (CA); Bahram Afghani, Laguna Beach, CA (US); Allan D. Anderson, Cerritos, CA (US); Patrick N. Godding, Lake Forest, CA (US); Maarten G. Punt, Lake Forest, CA (US); Mehdi Sotoodeh, Mission Viejo, CA (US)

(73) Assignee: Rainbow Technologies, Inc., Irvine, CA (US)

( * ) Notice: Subject to any disclaimer, the term of this patent is extended or adjusted under 35 U.S.C. 154(b) by 0 days.

(21) Appl. No.: 09/281,017

(22) Filed: Mar. 30, 1999

Related U.S. Application Data
(60) Provisional application No. 60/166,006, filed on Jan. 15, 1999.

(51) Int. Cl.$^7$ .................. G06F 11/30; G06F 15/173; G06F 15/16; H04K 1/00
(52) U.S. Cl. .................. 713/200; 713/201; 713/202; 709/223; 709/224; 709/225; 709/229; 705/55; 705/57; 705/58; 705/67
(58) Field of Search ............... 713/200, 201, 713/202; 709/223, 224, 225, 229; 705/57, 67, 55, 58

(56) References Cited

U.S. PATENT DOCUMENTS

| | | | |
|---|---|---|---|
| 4,799,258 A | | 1/1989 | Davies |
| 5,212,729 A | * | 5/1993 | Schafer ............... 705/55 |
| 5,386,369 A | * | 1/1995 | Christiano ............ 705/400 |
| 5,664,950 A | * | 9/1997 | Lawrence ............. 439/76.1 |
| 5,706,426 A | * | 1/1998 | Hsu .................. 713/200 |
| 5,754,761 A | * | 5/1998 | Willsey .............. 713/200 |
| 5,812,662 A | * | 9/1998 | Hsu et al. ............ 705/55 |
| 5,857,024 A | | 1/1999 | Nishino et al. |
| 5,870,080 A | * | 2/1999 | Burnett et al. ........ 345/163 |
| 6,052,468 A | * | 4/2000 | Hillhouse ............. 380/281 |
| 6,128,741 A | * | 10/2000 | Goetz et al. .......... 713/200 |
| 6,216,230 B1 | * | 4/2001 | Rallis et al. ......... 713/185 |
| 6,317,836 B1 | * | 11/2001 | Goren et al. .......... 713/200 |
| 6,425,084 B1 | * | 7/2002 | Rallis et al. ......... 713/185 |

FOREIGN PATENT DOCUMENTS

| | | |
|---|---|---|
| EP | 0 791 877 A1 | 8/1997 |
| GB | 2 154 344 A | 9/1985 |

OTHER PUBLICATIONS

Cebit–Aladdin Updates Hasp Remote Update System, Newsbytes, Mar. 15, 1995.*
Rainbow's NetSwift Igate Closes The Door On Internet Bad Guys, Network Computing, 2002.*
Mahabharat, India: PC Card Keeps Hackers At Bay, Newsbytes, Nov. 17, 1992.*
Cone, Digtial Locksmiths, Informationweek, 1995.*
Aladdin Brings Security Hardware Dongle To Imac USB, Newsbytes, Nov. 16, 1998.*
HASP Professional Software Protection White papers 1 and 2, http://www.eladdin.com/hasp, pp. 1–7, and pp. 1–16.*
WIBU–Systems AG, "WIBU–KEY User's Guide Version 2.50", Jul. 1998, XP002139265, Internet: <URL:ftp://www2.wibu.de/pub/download/us/UG250US.pdf>, pp. 12–14, 163–164.
Rainbow Technologies, News Release, "Rainbow Technologies Adds USB Support For PC And Macintosh Software Developers To Sentinel Line," Nov. 17, 1998, XP002139273, Internet: http://www.rainbow.com/invest/PR981117b.html (2 pages).

* cited by examiner

*Primary Examiner*—Gail Hayes
*Assistant Examiner*—Jenise Jackson
(74) *Attorney, Agent, or Firm*—Gates & Cooper LLP

(57) ABSTRACT

A method, apparatus, article of manufacture, and a memory structure for a USB-compliant personal key has been described. The personal key includes an integrated connector design that is simple and easy to manufacture, and allows broken or defective connecting pins to be easily replaced. In the several embodiments disclosed, the personal key also comprises a biometric sensor for authenticating the identity of the user, and visual and aural sensors for providing information to the user.

21 Claims, 10 Drawing Sheets

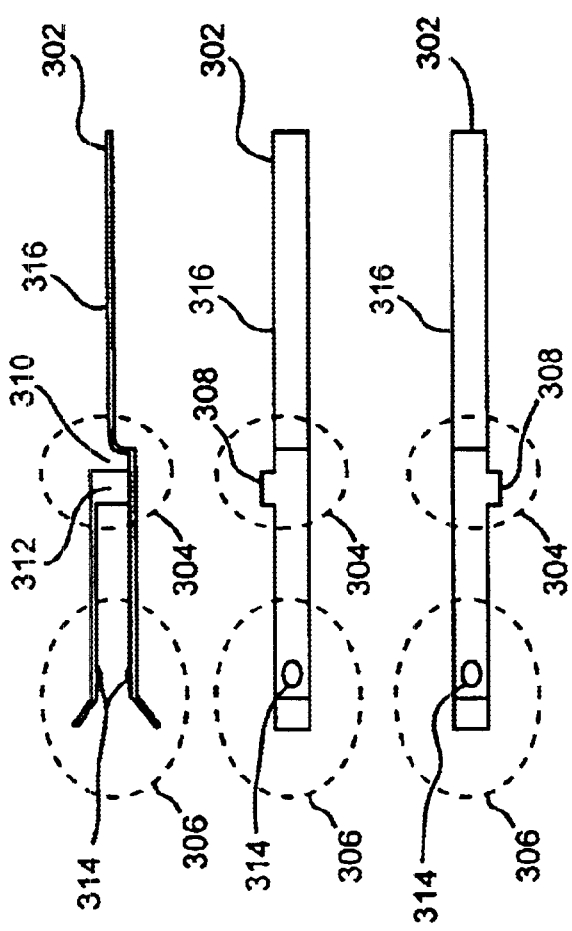
FIG. 3A SIDE
FIG. 3B TOP
FIG. 3C BOTTOM

INSTALL PINS INTO CAVITIES
FORMED BY PIN RESTRAINING
MEMBERS IN HOUSING

FILL LED ORIFICE WITH EPOXY DP 270, CLEAR, UNTIL LEVEL WITH HOUSING TOP SURFACE

USB-COMPLIANT PERSONAL KEY

CROSS-REFERENCE TO RELATED APPLICATIONS

This application claims benefit of U.S. Provisional Patent Application No. 60/166,006, filed Jan. 15, 1999 by Shawn D. Abbott, Bahram Afghani, Allan D. Anderson, Patrick N. Godding, Maarten G. Punt, and Mehdi Sotoodeh, and entitled "USB-Compliant Personal Key," which application is hereby incorporated by reference herein.

BACKGROUND OF THE INVENTION

1. Field of the Invention

The present invention relates to computer peripherals, and in particular to a personal key providing integrated password and digital certificate management, software security, and personal identification capability in a single compact package.

2. Description of the Related Art

In the last decade, the use of personal computers in both the home and in the office have become widespread. These computers provide a high level of functionality to many people at a moderate price, substantially surpassing the performance of the large mainframe computers of only a few decades ago. The trend is further evidenced by the increasing popularity of laptop and notebook computers, which provide high-performance computing power on a mobile basis.

The widespread availability of personal computers has had a profound impact on interpersonal communications as well. Only a decade ago, telephones or fax machines offered virtually the only media for rapid business communications. Today, a growing number of businesses and individuals communicate via electronic mail (e-mail). Personal computers have also been instrumental in the emergence of the Internet and its growing use as a medium of commerce.

While certainly beneficial, the growing use of computers in personal communications, commerce, and business has also given rise to a number of unique challenges.

First, the growing use of computers has resulted in extensive unauthorized use and copying of computer software, costing software developers substantial revenue. Although unauthorized copying or use of software is a violation of the law, the widespread availability of pirated software and enforcement difficulties have limited the effectiveness of this means of preventing software piracy.

Software developers and computer designers alike have sought technical solutions to attack the problem of software piracy. One solution uses an external device known as a hardware key, or "dongle" coupled to an input/output (I/O) port of the host computer.

While the use of such hardware keys is an effective way to reduce software piracy, to date, their use has been substantially limited to high value software products. Hardware keys have not been widely applied to popular software packages, in part, because the hardware keys are too expensive, and in part, because there is a reluctance on the part of the application program user to bother with a hardware key whenever use of the protected program is desired.

While it reflects a tremendous advance over telephones and facsimile machines, e-mail also has its problems. One of these problems involves security. Telephone lines are relatively secure and a legally sanctioned way to engage in the private transmission of information, however, e-mails are generally sent over the Internet with no security whatsoever. Persons transmitting electronic messages must be assured that their messages are not opened or disclosed to unauthorized persons. Further, the addressee of the electronic message should be certain of the identity of the sender and that the message was not tampered with at some point during transmission.

Although the packet-switching nature of Internet communications helps to minimize the risk of intercepted communications, it would not be difficult for a determined interloper to obtain access to an unprotected e-mail message.

Many methods have been developed to secure the integrity of electronic messages during transmission. Simple encryption is the most common method of securing data. Both secret key encryption such as DES (Data Encryption Standard) and public key encryption methods that use both a public and a private key are implemented. Public and private key encryption methods allow users to send Internet and e-mail messages without concern that the message will be read by unauthorized persons or that its contents will be tampered with. However, key cryptographic methods do not protect the receiver of the message, because they do not allow the recipient to authenticate the validity of the public key or to validate the identity of the sender of the electronic message.

The use of digital certificates presents one solution to this problem. A digital certificate is a signed document attesting to the identity and public key of the person signing the message. Digital certificates allow the recipient to validate the authenticity of a public key. However, the typical user may use e-mail to communicate with hundreds of persons, and may use any one of several computers to do so. Hence, a means for managing a number of digital certificates across several computer platforms is needed.

Internet commerce raises other challenges. Users seeking to purchase goods or services using the Internet must be assured that their credit card numbers and the like are safe from compromise. At the same time, vendors must be assured that services and goods are delivered only to those who have paid for them. In many cases, these goals are accomplished with the use of passwords. However, as Internet commerce becomes more commonplace, customers are finding themselves in a position where they must either decide to use a small number of passwords for all transactions, or face the daunting task of remembering multiple passwords. Using a small number of passwords for all transactions inherently compromises security, since the disclosure of any of the passwords may lead to a disclosure of the others. Even the use of a large number of passwords can lead to compromised security. Because customers commonly forget their password, many Internet vendors provide an option whereby the user can be reminded of their password by providing other personal information such as their birthplace, mother's maiden name, and/or social security number. This feature, while often necessary to promote Internet commerce, severely compromises the password by relying on "secret" information that is in fact, publicly available.

Even in cases where the user is willing and able to keep track of a large number of passwords, the password security technique is often compromised by the fact that the user is inclined to select a password that is relatively easy to remember. It is indeed rare that a user selects a truly random password. What is needed is a means for generating and managing random passwords that can be stored and recalled for use on a wide variety of computer platforms.

Internet communications have also seen the increased use of "cookies." Cookies comprise data and programs that keep track of a user's patterns and preferences that can be downloaded from the Internet server for storage on the user's computer. Typically, cookies contain a range of addresses. When the browser encounters those addresses again, the cookies associated with the addresses are provided to the Internet server. For example, if a user's password were stored as a cookie, the use of the cookie would allow the user to request services or goods without requiring that the user enter the password again when accessing that service for the second and subsequent time.

However beneficial, cookies can also have their dark side. Accordingly, many users object to storage of cookies on their computer's hard drive. In response to these concerns, Internet browser software allows the user to select an option so that they are notified before cookies are stored or used. The trouble with this solution is that this usually results in an excessive number of messages prompting the user to accept cookies. A better solution than this all-or-nothing approach would be to allow the storage and/or use of cookies, but to isolate and control that storage and use to comply with user-specified criteria.

SUMMARY OF THE INVENTION

The present invention satisfies all of these needs with a personal key in a form factor that is compliant with a commonly available I/O interface such as the Universal Serial Bus (USB). The personal key includes a processor and a memory which implement software protection schemes to prevent copying and unauthorized use. The personal key provides for the storage and management of digital certificates, allowing the user to store all of his digital certificates in one media that is portable from platform to platform. The personal key provides for the generation, storage, and management of many passwords, providing additional security and relieving the user from the task of remembering multiple passwords. The personal key provides a means to store cookies and other Java-implemented software programs, allowing the user to accept cookies in a removable and secure form-factor. These features are especially useful when the present invention is used in a virtual private network (VPN).

Because the personal key is capable of storing virtually all of the user's sensitive information, it is important that the personal key be as secure as possible. Hence, one embodiment of the personal key also comprises a biometric sensor disposed to measure biometrics such as fingerprint data. The biometric sensor measures characteristics of the person holding the key (such as fingerprints) to confirm that the person possessing the key is the actual owner of the key.

Since the personal key represents a single, secure repository for a great deal of the data the user will need to use and interact with a variety of computer platforms, it is also important that the personal key be able to interface (i.e., transmit and receive data) with a large variety of computers and computer peripherals. Hence, one embodiment of the personal key includes an electromagnetic wave transception device such as an infrared (IR) transceiver. This transceiver allows the personal key to exchange information with a wide variety of computers and peripherals without physical coupling.

The personal key comprises at least one circuit board, having a processor and a memory communicatively coupled thereto, at least one circuit connection surface, providing electrical communication with the processor, at least one conductive pin for providing communication between the circuit connecting surface and a host processing device, wherein the conductive pin is releasably coupleable to the circuit connection surface and comprises a pin securing portion, and a housing having a pin interfacing portion mateable with the pin securing portion for securing the pin member along a longitudinal axis of the conductive pin.

The present invention also comprises a method for producing the low cost personal key. The method comprises the steps of installing at least one connecting pin in a first housing member having at least one pin restraining member, the connecting pin having a clip portion and a tab portion mating with a pin restraining member notch in the pin restraining member, inserting a circuit connection surface disposed on a circuit board having a processor and a memory communicatively coupled with the processor in the clip portion, and mating a second housing member with the first housing member. The present invention also comprises an article of manufacture created by performing the method steps described above.

BRIEF DESCRIPTION OF THE DRAWINGS

Referring now to the drawings in which like reference numbers represent corresponding parts throughout:

FIGS. 3A and 3D are diagrams showing one embodiment of a conductive pin of the present invention;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
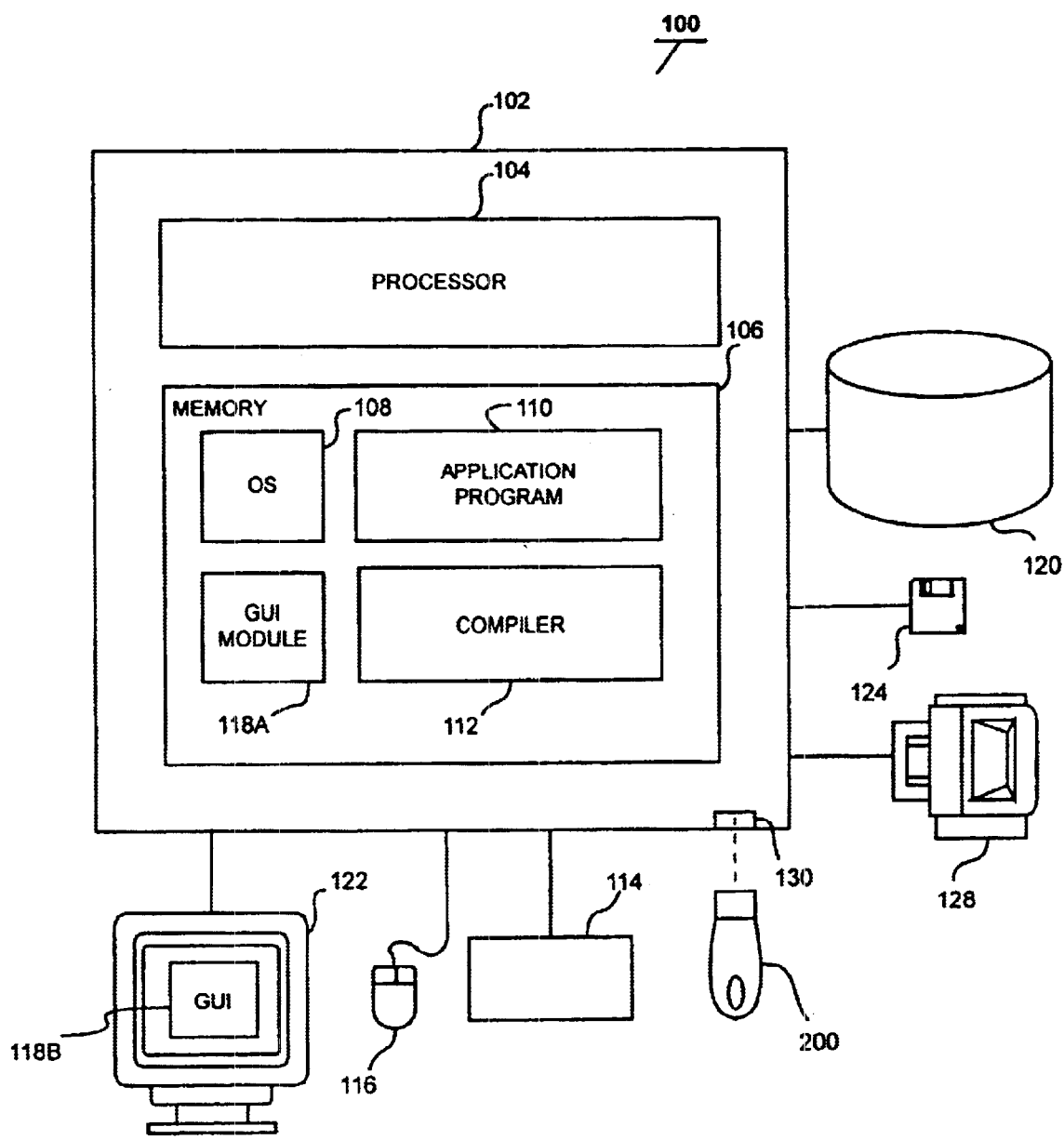
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 11 8B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130 for a personal key 200. In one embodiment, the I/O port is a USB-compliant port.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Figures 2A, 2B, 2C:
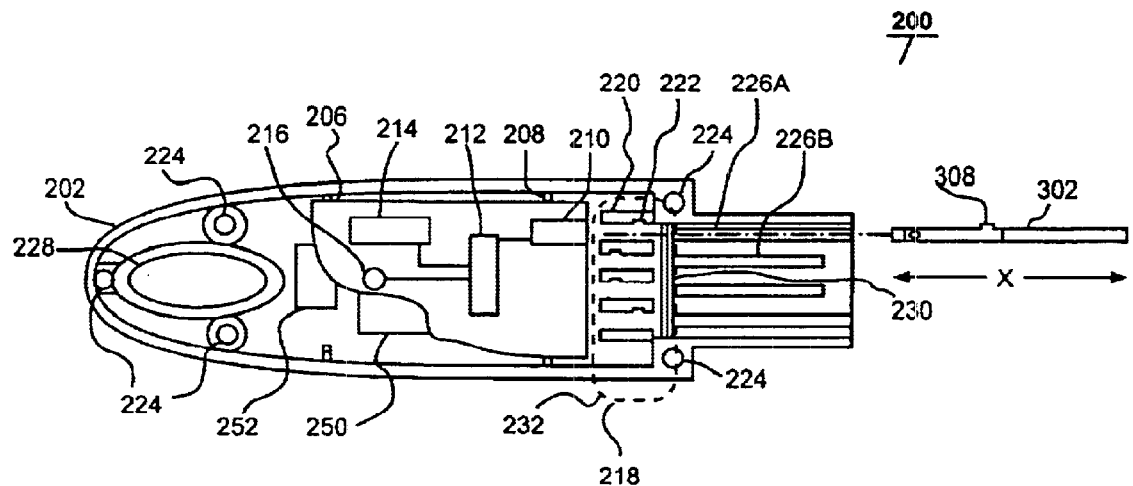
FIGS. 2A–2C are diagrams presenting illustrations of one embodiment of the personal key.

FIGS. 2A–2C are diagrams presenting illustrations of one embodiment of the personal key 200. The personal key 200 comprises a first housing member 202 and a second housing member 204. The first housing member 202 is sized and shaped so as to accept a circuit board 206 therein.

The first housing member 202 comprises a plurality of bosses 224, which, when inserted into each respective hole 240 in the second housing member 204, secures the first housing member 202 to the second housing member 204. The first housing member 202 and the second housing member 204 also each comprise an aperture 228, which allows the personal key 200 to be affixed to a key chain.

The circuit board 206 is held in position by a plurality of circuit board supports 208. The circuit board 206 comprises a substantially flat circuit connection surface 210 on the periphery of the circuit board 206 for communicative coupling with the host processing device or computer 120 via conductive pins, as described further herein. Circuit connection surface 210 allows communication with a processor 212 mounted on the circuit board 206. The processor 212 comprises memory and instructions for performing the operations required to implement the functionality of the personal key 200 as disclosed herein. The processor is communicatively coupled with a memory 214 on the circuit board to store and retrieve data as required by processor 212 instructions. In the illustrated embodiment, the circuit board also comprises a light emitting device 216 such as a light emitting diode (LED) which provides the user of the personal key 200 a visual indication of the activities being performed by the personal key 200. This is accomplished, for example, by emitting light according to a signal passing from the host computer 102 to the personal key 200. The light emitting device could also comprise a liquid crystal display or other device providing a visual indication of the functions being performed in the personal key or data passing to or from the personal key 200.

The energy from the light emitting device 246 is presented to the user in one of two ways. In the embodiment illustration ion FIGS. 2A–2C, the light emitting device 244 is disposed through a light emitting device orifice 244 in the second housing member 204. In this design, the personal key 200 can be sealed with the addition of a small amount of epoxy or other suitable material placed in the light emitting device orifice 244 after assembly.

In another embodiment, the light emitting device 246 does not extend beyond the interior of the housing 202, 204, and remains internal to the personal key 200. In this embodiment, at least a portion of the first housing 202 or the second housing 204 is at least partially translucent to the energy being emitted by the light emitting device 246 at the bandwidths of interest. For example, if the light emitting device 246 were a simple LED, the second housing 204 can be selected of a material that is translucent at visual wavelengths. One advantage of the foregoing embodiment is that the LED can be placed where it does not allow electromagnetic discharges and other undesirable energy to the circuit board 206 or any of the components disposed thereon. This is because no part of the LED, even the surface, is in contact with the user's hand at any time.

While the foregoing has been described with a single light emitting device 246, the present invention can also advantageously embody two or more light emitting devices, or devices emitting energy in other wavelengths. For example, the foregoing can be implemented with a three color LED (red, yellow and green), or three one-color LEDs to transfer personal key 200 information to the user.

In addition to or as an alternative to the foregoing, information regarding the operation of the personal key 200 is provided by an aural transducer such as a miniaturized loudspeaker or piezoelectric transducer. Such aural information would be particularly beneficial to users with limited or no vision. For example, the aural transducer can be used to indicate that the personal key 200 has been inserted properly into the host computer 120 I/O port 130.

An aural transducer may also be used to provide alert information to the user. This is particularly useful in situations where the user is not expecting any input or information from the key. For example, if the personal key 200 or related device is engaged in lengthy computations, the aural transducer can indicate when the process is complete. Also, the aural transducer can indicate when there has been an internal fault, or when there has been an attempt to compromise the security of the key with infected or otherwise harmful software instructions.

Further, it is envisioned that as the use of personal keys 200 will become widespread, it will be beneficial to incorporate the functions of other devices within the personal key. For example, a device such as a paging transceiver can be incorporated into the personal key to allow the user to be summoned or contacted remotely. Or, the personal key 200 may be used to store programs and instructions such as the user's calendar. In this application, the personal key 200 can be used to remind the user of events on the calendar, especially in conjunction with the LCD display discussed above. The aural transducer can be operated at a wide variety of frequencies, including minimally audible vibrational frequencies. This design is particularly beneficial, since the personal key is small enough to be placed on the user's key ring, where it will be in pocket or purse for lengthy periods of time where it cannot be seen or easily heard.

While the portability and utility of the personal key has many advantages, it also has one important disadvantage. It can be lost or stolen. This is especially troublesome because the personal key 200 represents a secure repository for so much of the user's private data. For these reasons, the ultimate security of the information contained in the personal key 200 (but not necessarily the personal key 200 itself) is highly important.

Ultimately, the personal key 200 identifies the possessor to the outside world through the host computer 102, but there is no guarantee that the person in possession of the personal key 200 is the actual owner, because the personal key may have been lost or stolen. Security can be increased with the use of personal passwords and the like, but this solution is not ideal. First, the use of a single password raises the very real possibility that the password may have been compromised (after all, the thief may know the user, and hence, the user's password). The use of multiple passwords is no solution because one of the reasons for using the personal key 200 is to relieve the user of the need to remember a number of passwords. Another problem with passwords is that hacking methods can be employed to circumvent the password protection or to discover the password itself. This is especially problematic in context of a personal key 200 which must depend on data entered in a host computer 120 peripheral such as the keyboard 114 and transmitted via the input/output port 130, rendering the personal key 200 vulnerable to hacking.

In one embodiment of the present invention, a biometric sensing device 250 is mounted on the housing 202, 204 to collect biometric data from the user when the user is holding the personal key 200. In one embodiment, the biometric sensing device 250 comprises a fingerprint sensor, which is capable of reading the user's fingerprints. The biometric sensor 250 may also include built-in processing to reduce the biometric data to data suitable for use by the processor 212. If necessary for the collection of biometric data, the light emitting device 216 can be placed proximate to the biometric sensor to provide an active data measurement using light or heat.

The biometric sensor 250 is nominally placed where it can best measure the biometric data of interest. In the illustrated embodiment, the biometric sensor 250 is sized and disposed to collect data from the user's thumbprint when the user grips the personal key 200 to insert it into the host computer 120 I/O port 130. To facilitate measurement of the holder's fingerprint, the housing 202, 204 can be designed to cradle the user's thumb in a particular place. Alternatively, to increase security, the housing 202, 204 may be designed to mask the presence of the biometric sensor 250 entirely.

The biometric sensor 250 can be advantageously placed in a position where it can be expected to collect known data of a predictable type, at a known time (for example, obtaining a thumbprint when the personal key 200 is plugged into the host computer I/O port 130). The personal key 200 accepts data from the biometric sensor 250 to verify the identity of the person holding the key with no passwords to remember or compromise, or any other input. Thus, the biometric sensor 250 provides a personal key 200 with a heightened level of security which is greater than that which can be obtained with a biometric sensor or passwords alone. If necessary, the personal key 200 can be configured to recognize the host computer 120 it is plugged into, and using data thus obtained, further increase the security of the key.

The biometric sensor can also be used to increase the security of the personal key in other ways as well. For example, the biometric sensor can be used to measure the fingerprint of the thief. This data can be stored and retained until such time as the thief attempts to use the personal key to make a purchase, for example on the Internet. At this time, the personal key 200 can be programmed to contact (with or without visibility to the thief) a particular entity (such as an Internet site), where the fingerprint information (and any other relevant information) can be transferred to the appropriate authority. The personal key 200 may also perform this dial up and report function if a number of incorrect passwords have been supplied.

In one embodiment of the present invention, the personal key 200 also comprises a data transceiver 252. The data transceiver is communicatively coupled to the processor 212, and allows the personal key 200 to transmit and receive data via the transmission and reception of electromagnetic waves. In one embodiment, the data transceiver 252 comprises an infrared (IR) transceiver that can communicate with a number of commercially available peripherals with similar capability. This feature is particularly useful, because it provides the personal key 200 another means for communicating with external peripherals and devices, even when the personal key 200 is already coupled to the I/O port 130 of the host computer 102.

As set forth more fully below, the present invention embodies a unique housing and pin design in which the connector is an integral part of housing members 202, 204 formed of polybutylene terephthalate (PBT). The result is high quality product at significant cost savings over traditional designs.

When mated together, the first housing member 202 and the second housing member 204 form a pin interfacing portion 218 which acts cooperatively with pins 302 to secure the pins in place, and yet allow the pins 302 to be easily assembled when the first housing member 202 and the second housing member 204 are not assembled together.

The pin interfacing portion 218 comprises a first pin interfacing portion 232 disposed on the first housing member 202 and a second pin interfacing portion 242 disposed on the second housing member 204. The first pin interfacing portion 232 includes one or more pin restraining members 220, each of which has a pin restraining member notched portion 222. The pin restraining member notched portion 222 mates or otherwise cooperatively interacts with the pin tab portion 308 on each pin 302 to hold or restrain the pin 302 from motion along the longitudinal (x) direction. At the same time, the pin restraining member notched portion 222 permits motion perpendicular to the longitudinal direction, thus permitting the pins to be installed in the housing 202, 204 during assembly and removed during disassembly.

FIGS. 3A–3C are diagrams illustrating one embodiment of the pins 302 of the present invention. The pin 302 comprises a clip portion 306 for coupling with the connection surfaces 210 on the circuit board 206. The clip portion 306 slides over the connection surfaces 210, where the pin jaw tabs 314 assist in making an electrical connection. The pin 302 also comprises a pin securing portion 304 having a pin tab portion 308 and a pin notch portion 310.

The pin tab portion 308 mates with the pin restraining member notched portion 222 to inhibit motion along the x-axis of the pin 302, while permitting the pin to be inserted and removed from the first housing member 202 when the first housing portion 202 and the second housing member 203 are separated. Similarly, the pin notch portion 310 is mateable with the second pin interfacing portion 242 when the first housing member 202 and the second housing member 204 are assembled. The mating of the pin notch portion 310 and the second pin interfacing portion 243, along with the mating between the pin tab portion 308 and the pin restraining member notched portion 222 releasably secures the pins 302 in place when the first housing member 202 and the second housing member 204 are assembled, while permitting removal of the pins 302 when the first housing member 204 and the second housing member 204 are disassembled.

Nominally, the USB interface requires four (4) pins 302, and that the pins 302 near the outer periphery of the personal key 200 be longer than that of the inner two pins. When the user inserts the personal key 200 into the input/output port 130, this assures that the power and ground pins 302 are connected before the pins that pass serial data are connected. To achieve this result, pins 302 of different lengths can be selected and used in the personal key 200.

Alternatively, pins 302 of the same length can be used as well. This is implemented by disposing the inner pin restraining member notched portions 222 (those used with the inner pins) in a location further inboard the personal key 200. Similarly, the second pin interfacing portion 242 on the second housing member 204 can be altered to add an offset portion 242B which is disposed inboard from the nominal portion 242A to account for the displacement of the pin notch portion 310.

The shank of the pins 316 can have a flat cross section, or may be formed to substantially match the shape of first pin guides 226A and 226B and the second pin guides 246. This increases the sealing integrity of the personal key 200, and prevents damage to the pins 302 when the personal key 200 is inserted into the input/output port 130.

The personal key also comprises a pin seal surface 230, which prevents foreign material from entering the personal key when the first housing member 202 and the second housing member 204 are placed together. If necessary, the entire personal key 200 can be sealed by placing a sealant material such as rubber or plastic material along the periphery of the first housing member 202 and the second housing member 204, before assembly. The pin seal surface 230 allows this seal to extend around the pins 230 as well.

Figure 4:
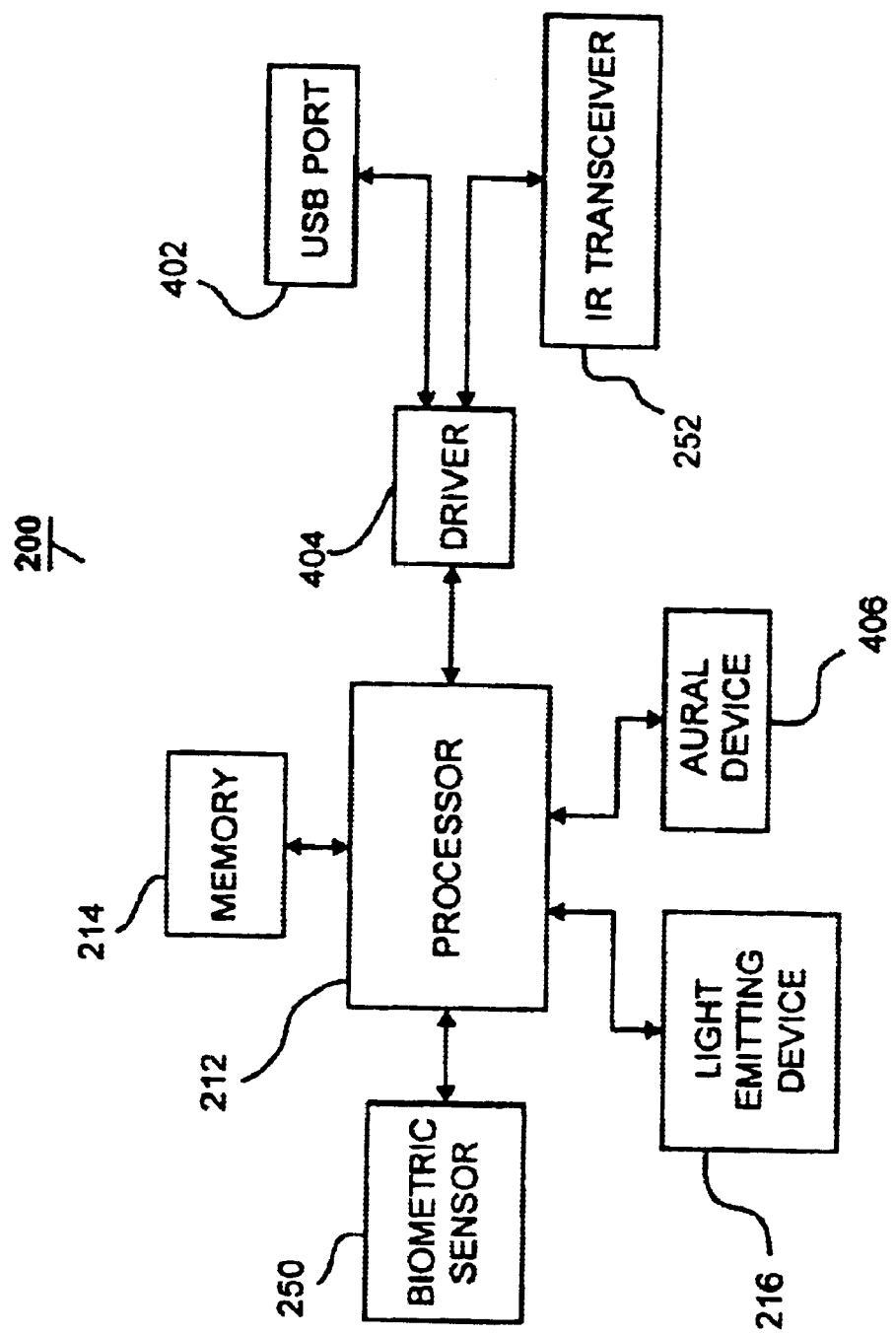
FIG. 4 is a block diagram illustrating selected modules of the present invention.

FIG. 4 is a block diagram illustrating selected modules of the present invention. The personal key 200 communicates with the host computer through the input/output port 130 of the host computer and a matching input/output (I/O) port 402 on the personal key 200. Signals received at the personal key I/O port 402 are passed to and from the processor 212 by a driver/buffer 404. The processor 212 is communicatively coupled to a memory 214, which may store data and instructions to implement the above-described features of the invention. The processor may also include some internal memory for performing some of these functions.

In one embodiment, a biometric sensor 250 is also communicatively coupled to the processor 212. The biometric sensor 250 provides data to the processor 212 and receives commands from the processor 212, as described earlier in this disclosure.

The processor is also optionally communicatively coupled to one or more light emitting devices 216 or other visual display device to provide a visual indication of the activities or status of the personal key 200. The processor 212 may also be communicatively coupled with an aural device 406 to provide a vibrational or audio data to the user of the status or activities of the personal key 200.

As described above, the personal key 200 optionally comprises a data transceiver 252, such as an infrared (IR) transceiver. This allows the personal key 200 to communicate with other devices and peripherals, without resorting to the personal key I/O port 402. The data transceiver 252 is coupled to the processor via the driver 404.

One of the advantages of the design described in the foregoing disclosure is that the design of the pins 302, with integrated tab and notch portions matingly matching with the pin interfacing portion 218 of the first housing member 202 and the second housing member 204, provide a secure means for retaining the pins 302 in place, yet allow the pins to be easily assembled into the housing and communicatively coupled with the circuit board connecting surface.

Another advantage is that the foregoing design allows for the pins 302 to be quickly and easily replaced (they are subject to damage from being inserted into the host computer I/O port numerous times, and from being carried in the pocket with potentially harmful debris and other objects). Since a personal key can become the central repository for a digital certificate, web-site favorites, and passwords and the line, it is beneficial to be able to quickly and easily replace a defective or bent pin 302 without replacing or otherwise modifying the circuit board or any of the components on it. De-soldering circuit board 206 connections, for example, risks damage to the processor and other circuit board components.

Figure 5:
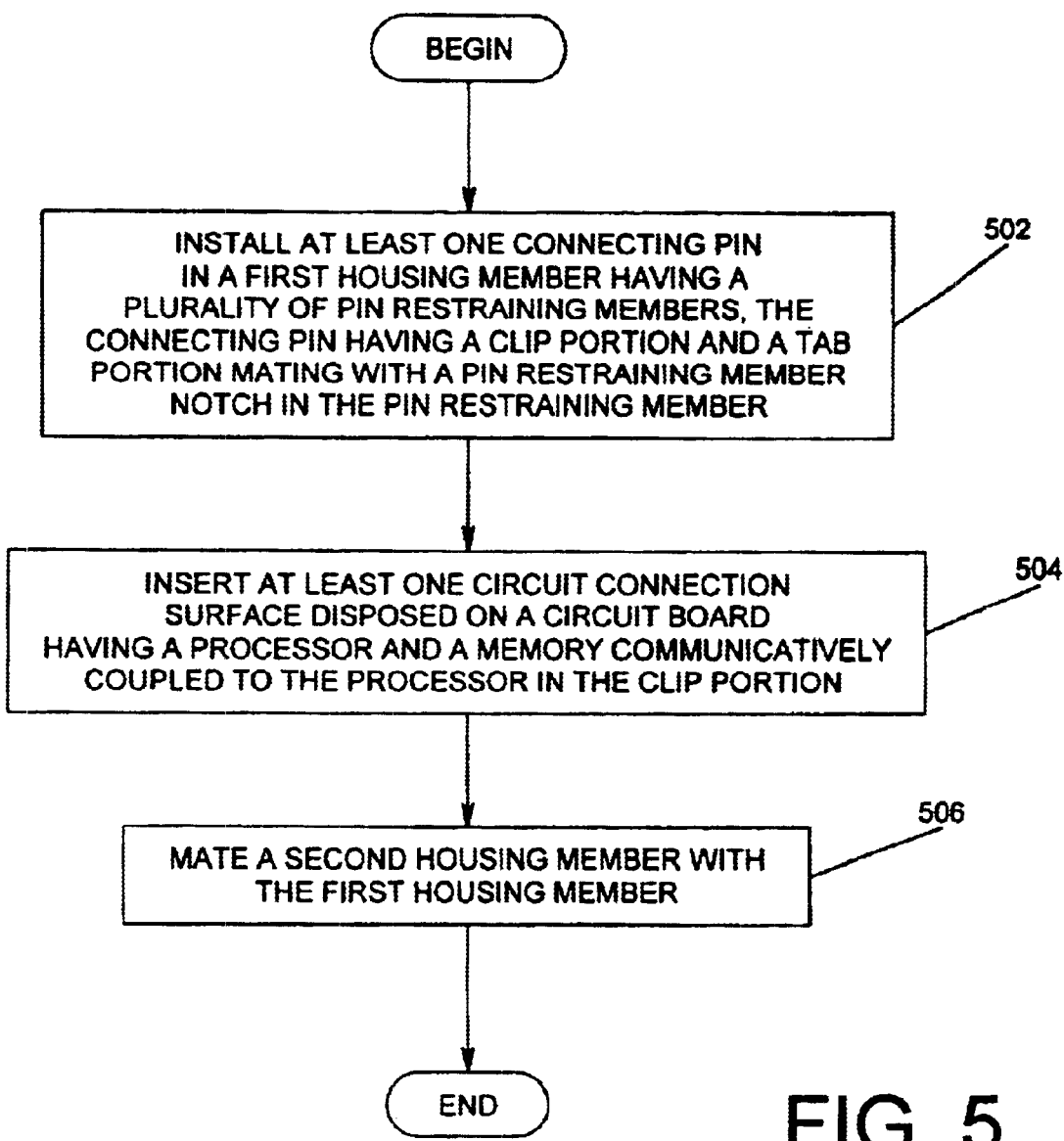
FIG. 5 is a flow chart showing illustrative process steps used to assemble the personal key.

FIG. 5 is a flow chart illustrating exemplary process steps used to assemble the personal key 200 described above. The discussion of the operations depicted in FIG. 5 will be presented in conjunction with the illustrations of FIGS. 6A–6K. The design of the pins 302, with integrated tab and notch portions matingly matching with the pin interfacing portion 218 of the first housing member 202 and the second housing member 204 provide a secure means for retaining the pins 302 in place, yet allow the pins to be easily assembled into the housing and communicatively coupled with the circuit board connecting surface. The pin design 302 also permits easy disassembly should it be required.

Referring first to FIG. 5, the process begins by installing at least one pin 302 in a first housing member 202 having a plurality of pin restraining members 220. This is depicted in block 502 of FIG. 5 and in FIGS. 6A and 6B. The pin tab portion 308 mates with the pin restraining member notched portion 222 to prevent motion of the pin 302 in the longitudinal axis, but permits the pin 302 to be placed into position. This step is repeated for every pin 302 to be included in the personal key 200. In the illustrated embodiment, four (4) pins 302 are used.

Next, the circuit board 206 is inserted into the first housing 202 such that the circuit connection surface 210 slidingly mates with the pin clip portion 306. This is depicted in block 504 of FIG. 5 and in FIGS. 6C–6E. The circuit board 206 is then positioned so that it rests on the circuit board supports 208 provided in the first housing portion 202. Optionally, at this point, sealing material such as a gasket or other sealant material can be placed about the periphery of the first housing member 202 and/or the second housing member 204.

Figure 6A:
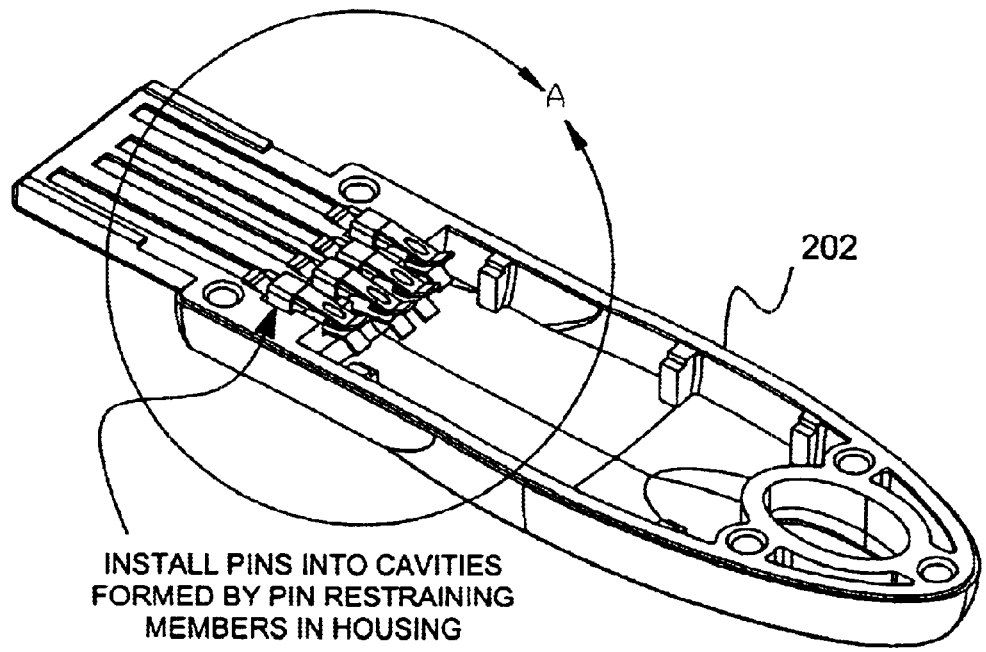
FIGS. 6A–6K are diagrams showing the assembly of the personal key.
Figure 6B:
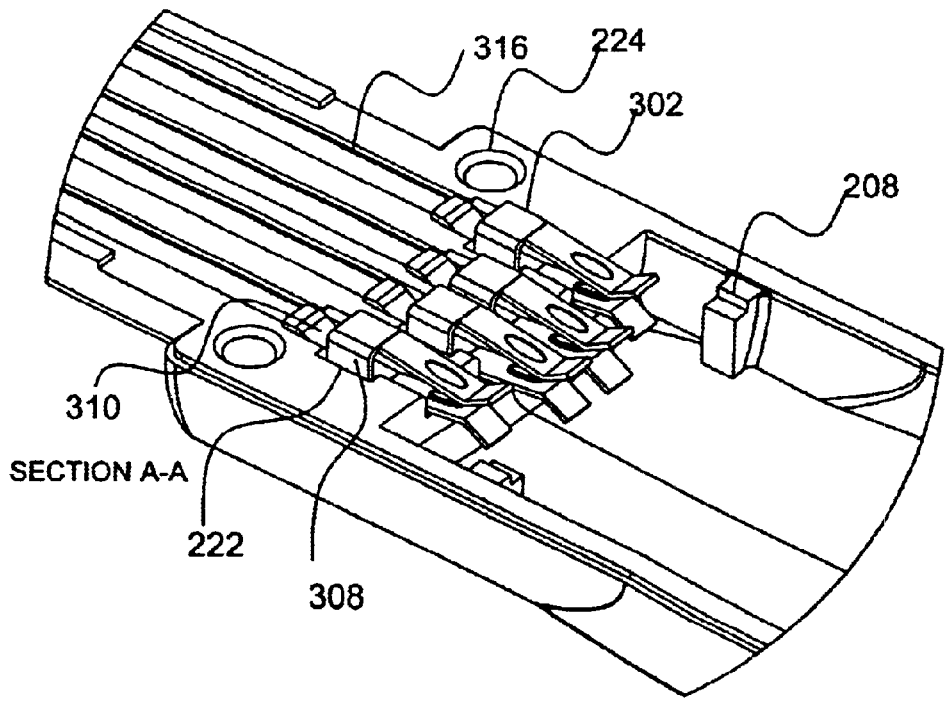
Figure 6C:
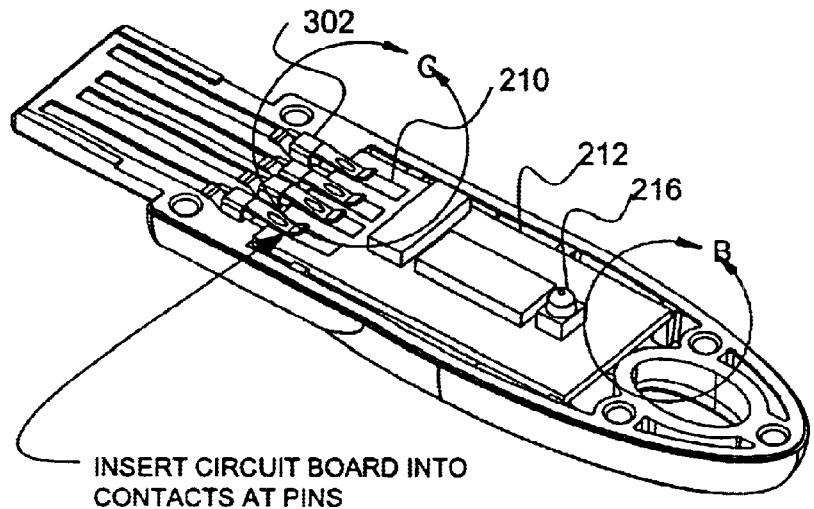
Figures 6D, 6E:
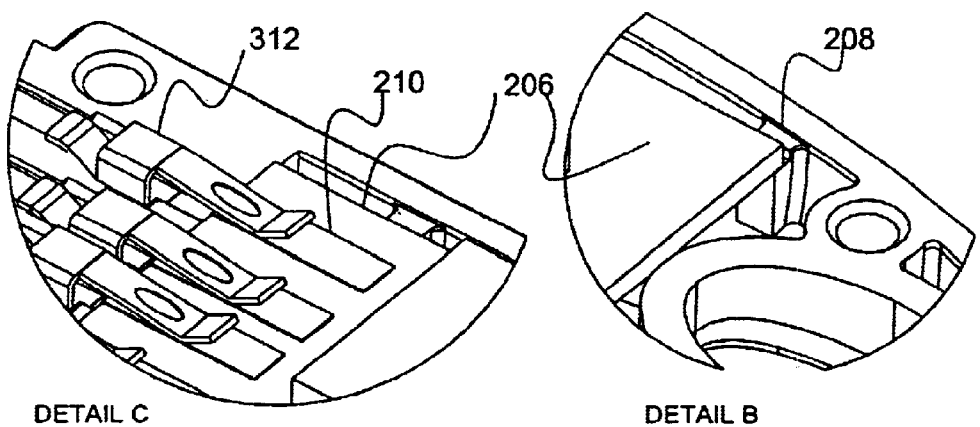
Figure 6F:
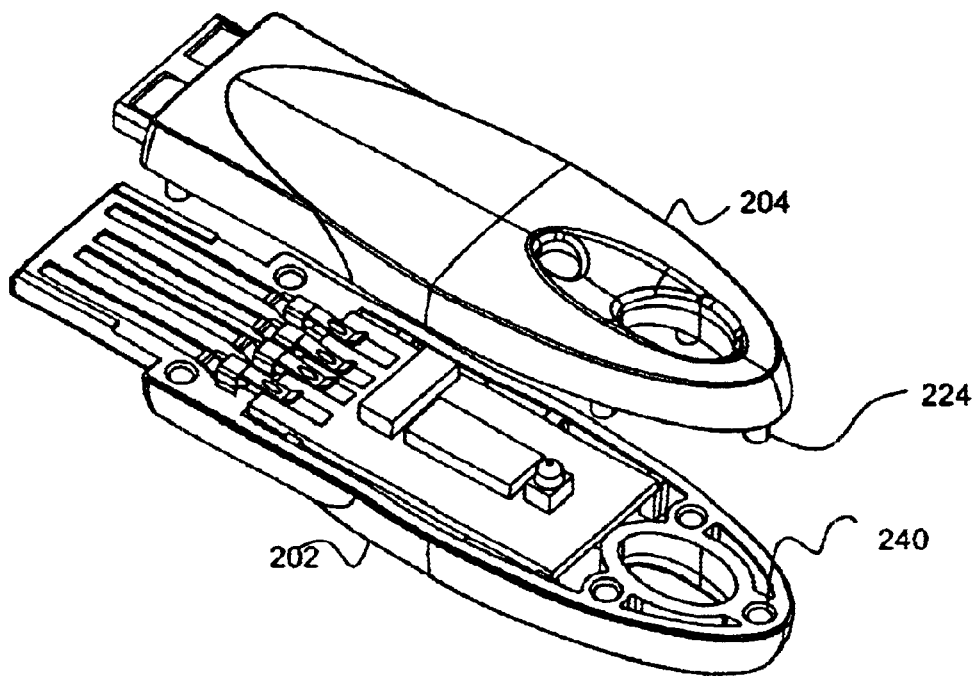
Figure 6G:
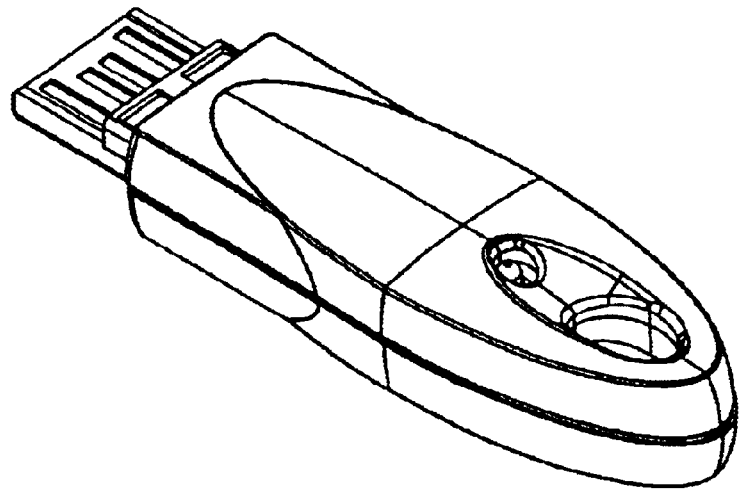

Next, the second housing member 204 is mated with the first housing member 202. This is shown in block 506 of FIG. 5 and in FIGS. 6F and 6G. The first housing member 202 is mated with the second housing member 204 such that bosses 224 insert into holes 240 in the second housing member 204. Once this is accomplished, the first housing member 202 and the second housing member 204 are pressed together, resulting in the personal key 200 as depicted in FIG. 6G.

Figure 6H:
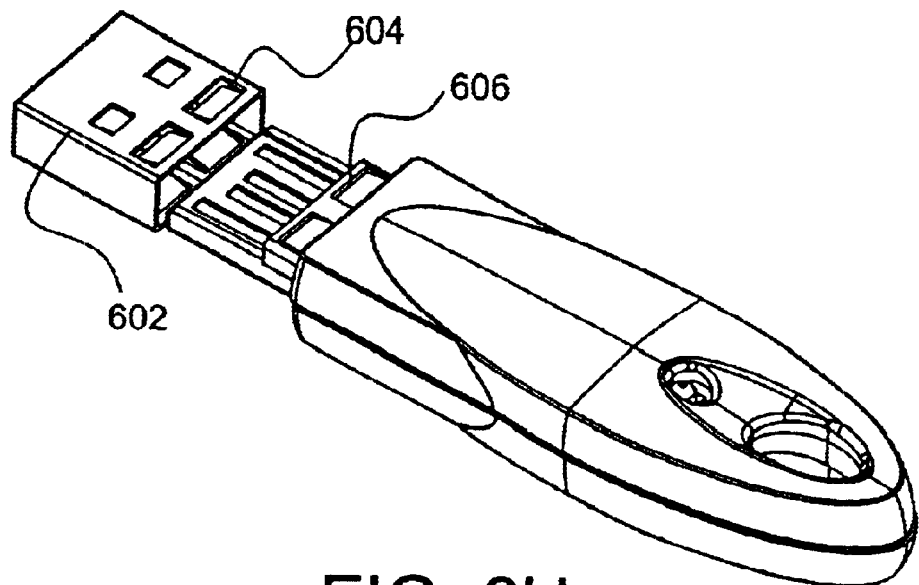
Figure 6I:
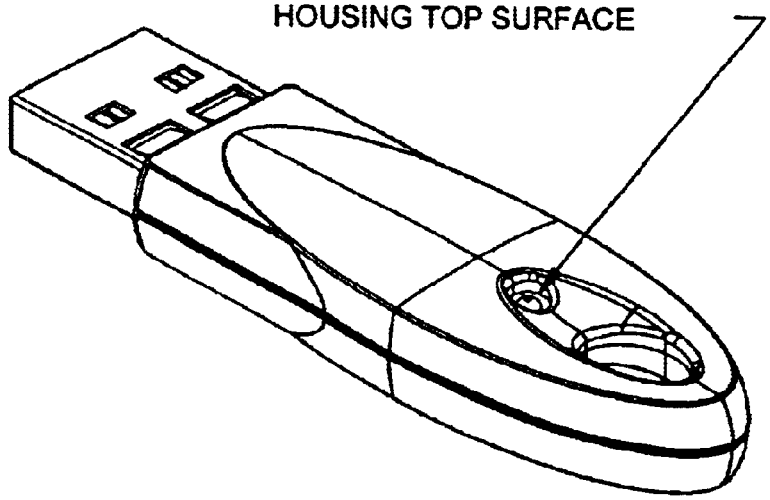
Figure 6J:
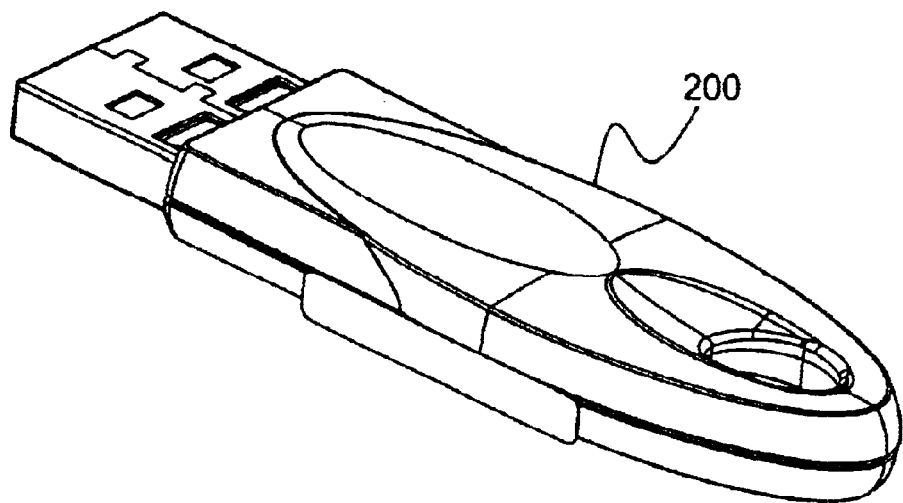
Figure 6K:
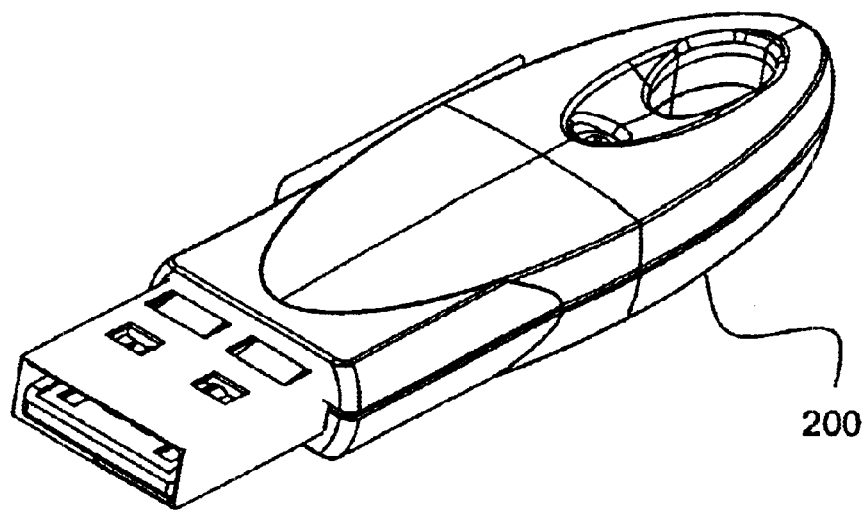

Then, a metallic shell 602 is placed around the portion of the personal key 200 having the pins 302, and snapped into place as shown in FIG. 6H. The metallic shell 602 comprises clip portions 604 that cooperatively mate with depressions 606 in the second housing member 204 and/or the first housing member 206 to hold it in place. If desired, the LED orifice 244 can then be filled with an at least partially transparent epoxy such as DP 270 until level with the housing top surface, as shown in FIG. 6I. This seals the personal key 200 from the entry of foreign materials through the LED orifice 244, and prevents the transmission of electrical discharge to the circuit board 206 and the components in connection therewith. This step is not required for embodiments of the personal key 200 wherein the personal key 200 first housing member 202 and/or second housing member 204 is comprised of translucent material, and where the light emitting device 216 remains disposed inside the personal key 200. The completed personal key 200 is shown in FIGS. 6J and 6K.

Conclusion

This concludes the description of the preferred embodiments of the present invention. In summary, the present invention describes a method, apparatus, and article of manufacture for a personal key.

The personal key comprises at least one circuit board, having a processor and a memory communicatively coupled thereto, at least one circuit connection surface, providing electrical communication with the processor, at least one conductive pin for providing communication between the circuit connecting surface and a host processing device, wherein the conductive pin is releasably coupleable to the circuit connection surface and comprises a pin securing portion, and a housing having a pin interfacing portion mateable with the pin securing portion for securing the pin member along a longitudinal axis of the conductive pin.

The present invention also comprises a method for producing the low cost personal key. The method comprises the steps of installing at least one connecting pin in a first housing member having at least one pin restraining member, the connecting pin having a clip portion and a tab portion mating with a pin restraining member notch in the pin restraining member, inserting a circuit connection surface disposed on a circuit board having a processor and a memory communicatively coupled with the processor in the clip portion, and mating a second housing member with the first housing member. The present invention also comprises an article of manufacture created by performing the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing personal key has been described as providing for electrical communication with the host communication, it is envisioned that such electrical communication includes the optical transfer of data such as is implemented by fiber optics and the like.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A compact electronic key, releasably coupleable to a host processing device, comprising:

at least one circuit board, having a processor and a memory communicatively coupled to the processor;

at least one circuit connection surface providing electrical communication with the processor;

at least one conductive pin for providing electrical communication between the circuit connecting surface and the host processing device, wherein the conductive pin comprises a pin securing portion and is releasably coupleable to the circuit connection surface; and a housing for substantially enclosing at least some of the circuit board, the housing comprising a pin interfacing portion mateable with the pin securing portion for securing the pin member along a longitudinal axis of the conductive pin.

2. The device of claim 1, wherein the conductive pin is slidingly coupleable to the circuit connection surfaces.

3. The device of claim 1, wherein the conductive pin member further comprises a clip portion for coupling with the circuit connection surfaces.

4. The device of claim 1, wherein the circuit connection surface is substantially planar and disposed proximate to the periphery of the circuit board.

5. The device of claim 1, wherein:

the pin interfacing portion comprises at least one pin restraining member having a pin restraining member notched portion;

the pin securing portion comprises a conductive pin tab portion; and wherein the pin restraining member notched portion is mateable with a conductive pin tab portion to restrain the conductive pin from motion along the longitudinal axis.

6. The device of claim 5, wherein the pin restraining member notched portion permits conductive pin member motion along an axis substantially perpendicular to the longitudinal axis.

7. The device of claim 6, wherein the housing comprises a first housing member and a second housing member securable to the first housing member, wherein:

the pin securing portion further comprises a conductive pin notch portion;

the pin interfacing portion comprises a first pin interfacing portion disposed on the first housing member, the first pin interfacing portion including the pin restraining member, and a second pin interfacing portion disposed on the second housing member, the second pin interfacing portion mateable with the conductive pin notch portion to restrain the conductive pin member from motion along the longitudinal axis of the conductive pin member.

8. The device of claim 1, wherein the housing is comprised of PBT plastic material.

9. The device of claim 1, wherein the processor is communicatively coupled to a light emitting device for emitting light according to at least one signal passing from the host processing device and the key.

10. The device of claim 9, wherein the light emitting device is physically coupled to the circuit board.

11. The device of claim 9, wherein the housing is comprised at least in part of a material of sufficient transparency to permit the emitted light to be visible external to the key.

12. The device of claim 1, further comprising a biometric sensor, communicatively coupled to the processor for providing biometric data to the processor.

13. The device of claim 12, wherein the biometric sensor is disposed so as to permit collection of biometric data from a user when the user holds the key.

14. The device of claim 13, wherein processor implements instructions for processing the biometric data to confirm the identity of the user.

15. The device of claim 1, further comprising a data transmitter communicatively coupled to the processor for transmitting data by emission of electromagnetic waves.

16. The device of claim 15, wherein the data transmit comprises an infrared device.

17. The device of claim 15, further comprising a data receiver communicatively coupled to the processor for receiving data transmitted via electromagnetic waves.

18. The device of claim 17, wherein the data receiver comprise an infrared device.

19. A compact electronic key, releasably coupleable to a host processing device, comprising:

at least one circuit board, having a processor and a memory communicatively coupled to the processor;

at least one circuit connection surface providing electrical communication with the processor;

at least one conductive pin member for providing electrical communication between the circuit connecting surface and the host processing device, wherein the conductive pin member comprises a pin securing portion and is releasably coupleable to the circuit connection surface; and a housing for substantially enclosing at least some of the circuit board, the housing comprising a fist housing member and a second housing member, and a pin interfacing portion mateable with the pin securing portion to secure the conductive pin member in all axes when the first housing member is mated to the second housing member, but permitting the conductive pin member motion in an axis substantially perpendicular to a longitudinal axis of the conductive pin member when the first housing member is not mated to the second housing member.

20. A method of assembling a compact electronic key, comprising the steps of:

installing at least one connecting pin in a first housing member having at least one pin restraining member, the connecting pin having a clip portion and tab portion mating with a pin restraining member notch in the pin restraining member;

inserting a circuit connection surface disposed on a circuit board having a processor and a memory communicatively coupled to the processor in the clip portion; and mating a second housing member with the first housing member.

21. A compact electronic key, assembled by performing the steps of:

installing at least one connecting pin in a first housing member having at least one pin restraining member, the connecting pin having a clip portion and tab portion mating with a pin restraining member notch in the pin restraining member;

inserting a circuit connection surface disposed on a circuit board having a processor and a memory communicatively coupled to the processor in the clip portion; and mating a second housing member with the first housing member.

* * * * *

UNITED STATES PATENT AND TRADEMARK OFFICE
CERTIFICATE OF CORRECTION

PATENT NO. : 6,671,808 B1  
DATED : December 30, 2003  
INVENTOR(S) : Shawn D. Abbott et al.

It is certified that error appears in the above-identified patent and that said Letters Patent is hereby corrected as shown below:

Column 12,
Line 58, after "member",",”(comma) should read -- ; -- (semicolon).

Column 13,
Line 20, "transmit" should read -- transmitter --.

Signed and Sealed this

Twenty-ninth Day of June, 2004

JON W. DUDAS
*Acting Director of the United States Patent and Trademark Office*